US011738723B2

United States Patent
Fritz et al.

(10) Patent No.: US 11,738,723 B2
(45) Date of Patent: Aug. 29, 2023

(54) VEHICLE WINDOW INSTALLATION TOOL

(71) Applicants: Kaitlyn J Fritz, Troy, MI (US); Mark L Lusky, Harrison Township, MI (US); Sandra C Smith, Rochester Hills, MI (US); Kyle Kindle, Lake Orion, MI (US)

(72) Inventors: Kaitlyn J Fritz, Troy, MI (US); Mark L Lusky, Harrison Township, MI (US); Sandra C Smith, Rochester Hills, MI (US); Kyle Kindle, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 47 days.

(21) Appl. No.: 17/194,467

(22) Filed: Mar. 8, 2021

(65) Prior Publication Data
US 2022/0281421 A1    Sep. 8, 2022

(51) Int. Cl.
*B60S 5/00* (2006.01)
*B25B 11/00* (2006.01)

(52) U.S. Cl.
CPC ............ *B60S 5/00* (2013.01); *B25B 11/00* (2013.01)

(58) Field of Classification Search
USPC .... 29/244, 253, 255, 257, 267, 276; 81/3.07
See application file for complete search history.

(56) References Cited

U.S. PATENT DOCUMENTS

| | | | | |
|---|---|---|---|---|
| 4,864,898 | A * | 9/1989 | Tricinella | B67B 7/16 81/3.55 |
| 7,967,277 | B2 * | 6/2011 | Chambers | B25C 11/00 7/166 |
| 8,365,378 | B1 * | 2/2013 | Lenart | B25C 11/00 15/50.1 |
| D880,969 | S * | 4/2020 | Lenart | D8/89 |
| 2007/0096463 | A1 * | 5/2007 | Kissel | F16L 37/0925 285/305 |
| 2008/0030035 | A1 * | 2/2008 | Wang | B25B 27/0092 294/50.8 |
| 2008/0315165 | A1 * | 12/2008 | Prater | B25B 27/00 254/25 |
| 2017/0107089 | A1 * | 4/2017 | Lenart | B25C 11/00 |
| 2017/0259416 | A1 * | 9/2017 | Caiman | B44D 3/22 |
| 2019/0292029 | A1 * | 9/2019 | Moore | B66F 3/36 |
| 2021/0308847 | A1 * | 10/2021 | Little | B25B 27/0035 |

* cited by examiner

*Primary Examiner* — Tyrone V Hall, Jr.
*Assistant Examiner* — Dana Lee Poon
(74) *Attorney, Agent, or Firm* — Jeremy J. Klobucar

(57) ABSTRACT

In at least some implementations, a vehicle window installation tool includes a front face defined at least in part by a first engagement surface, the front face extending from a first end to a second end, and from a left side to a right side, and a rear face defined at least in part by a second engagement surface, the rear face extending from the first end to the second end, and from the left side to the right side. The first end is wedge shaped, and a support portion is defined in part by the front face and in part by the rear face. The support portion has a void, the void is open to a second end that is opposite to the first end. The tool can be arranged in multiple positions relative to a window being assembled into the door, to protect and position the window.

16 Claims, 3 Drawing Sheets

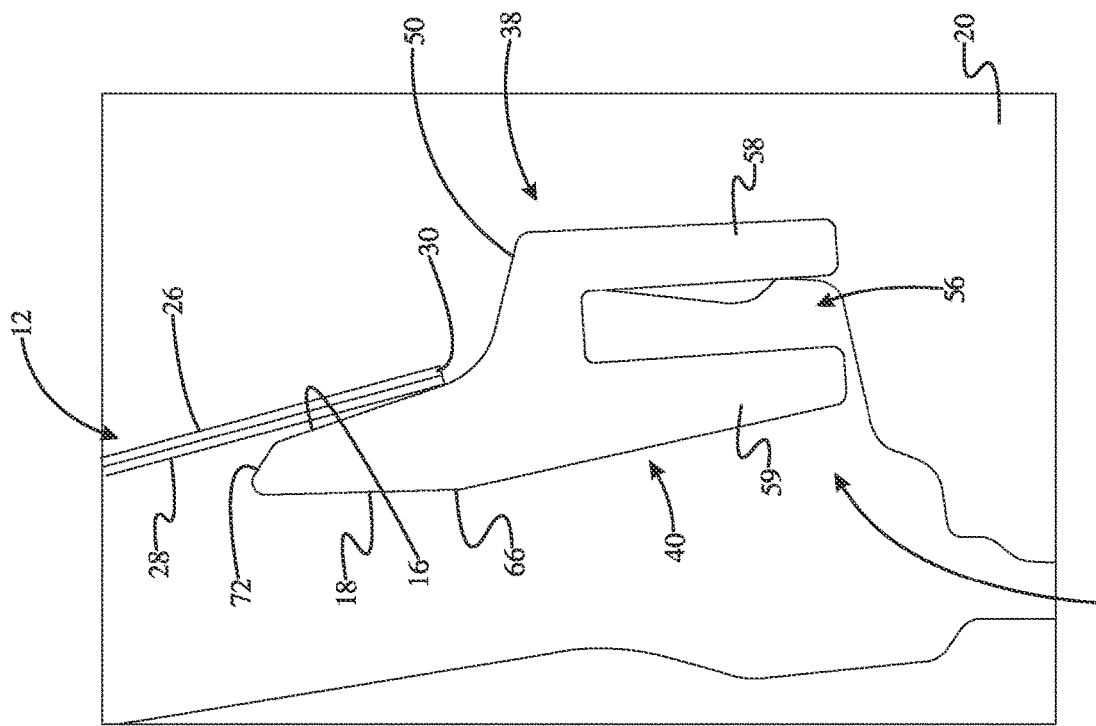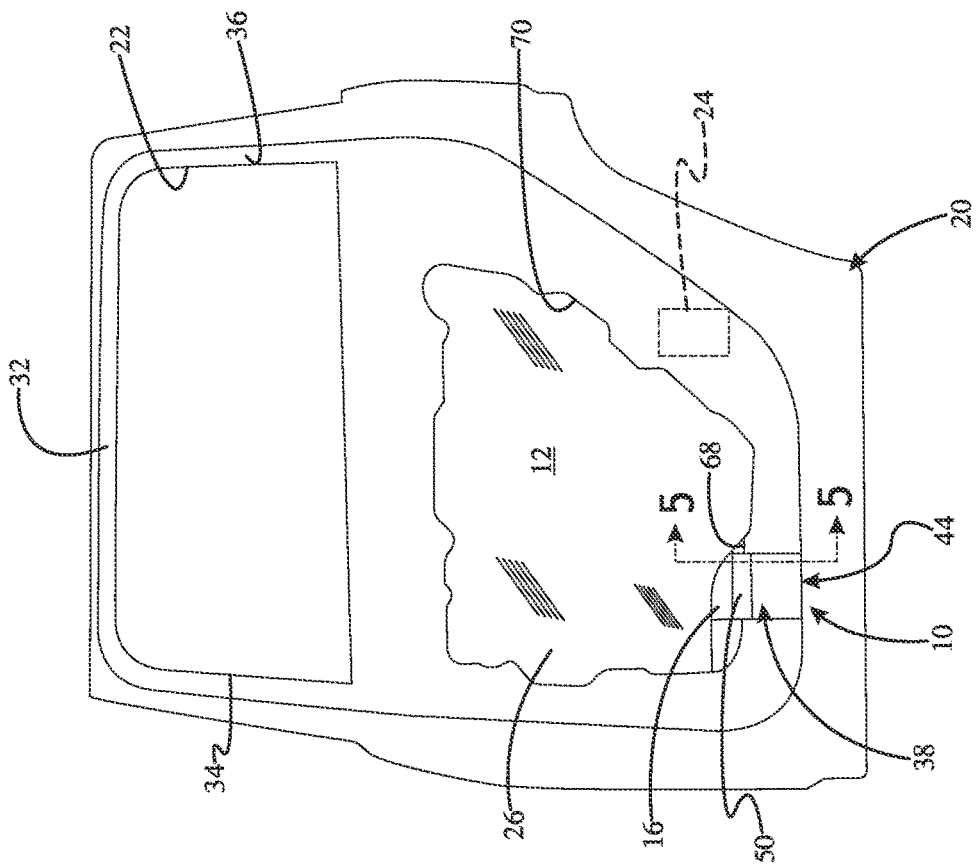

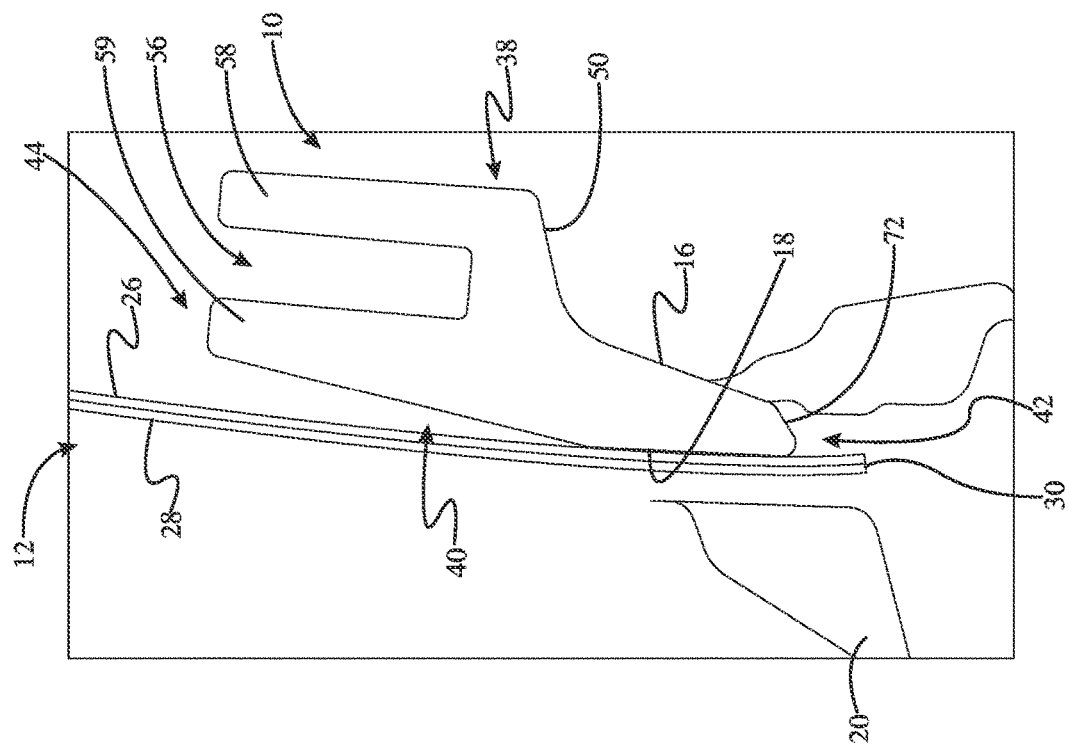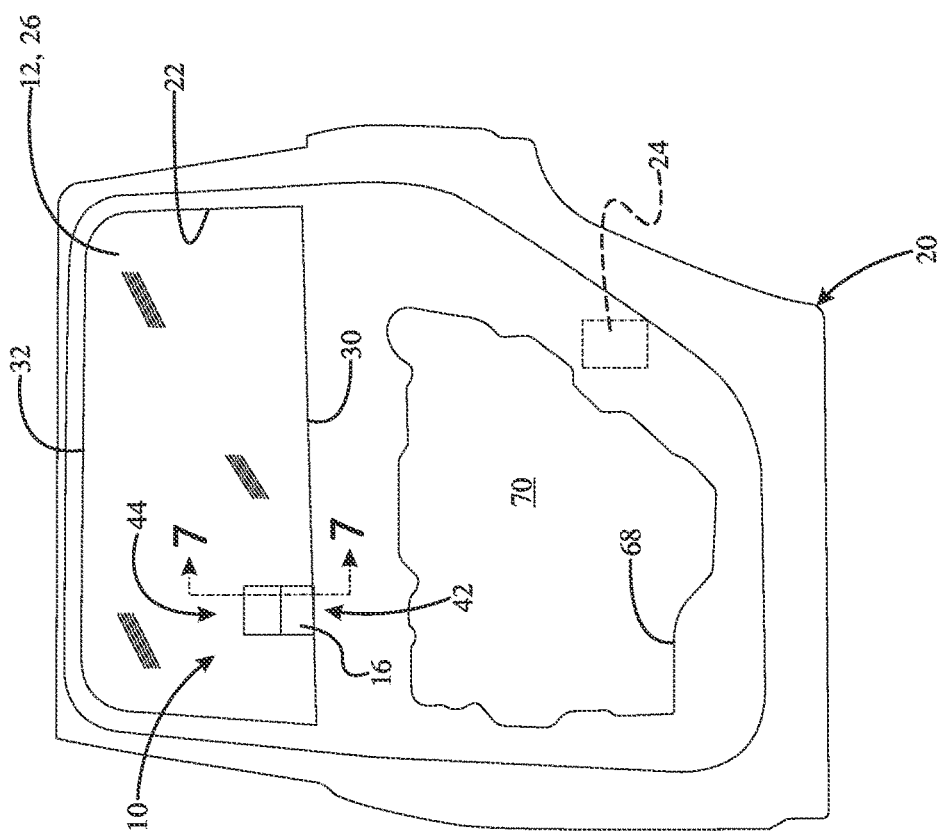

VEHICLE WINDOW INSTALLATION TOOL

FIELD

The present disclosure relates to a tool having multiple uses during installation of a vehicle window.

BACKGROUND

Some vehicles include doors that include windows movable relative to the door. The windows may be driven by an actuator between open and closed positions. The doors typically include metal frames, and the windows typically are glass and can be cracked or otherwise damaged during assembly. Further, it can be beneficial to maintain certain positions of the window relative to the door during assembly of the window into the door, and while the actuator is installed and/or coupled to the window.

SUMMARY

In at least some implementations, a vehicle window installation tool includes a front face defined at least in part by a first engagement surface, the front face extending from a first end to a second end, and from a left side to a right side, and a rear face defined at least in part by a second engagement surface, the rear face extending from the first end to the second end, and from the left side to the right side. The first end is wedge shaped, and a support portion is defined in part by the front face and in part by the rear face. The support portion has a void, the void is open to a second end that is opposite to the first end. The tool can be arranged in multiple positions relative to a window being assembled into the door, to protect and position the window.

In at least some implementations, the front face also includes a stop surface extending from and at an angle of at least 75 degrees relative to the first engagement surface. The stop surface may be arranged at an angle of between 90 degrees and 130 degrees relative to the first engagement surface. In at least some implementations, the stop surface has a thickness of at least twice the thickness of window with which the tool is used. In at least some implementations, the stop surface is located between the first end and the void, and the stop surface overlies at least part of the void.

In at least some implementations, an angle between the front face and rear face at the first end is less than 30 degrees.

In at least some implementations, the void is a channel that extends through the left side, the right side and the second end. The first engagement surface may be parallel to, or at an angle of 30 degrees or less from being parallel to, at least one of two sides of the channel.

In at least some implementations, the first engagement surface and second engagement surface each have a hardness between 60 D and 100 D on the Shore A hardness scale.

In at least some implementations, the second engagement surface is opposite to at least a portion of the first engagement surface, the second engagement surface extends from the first end at a non-parallel angle to the first engagement surface such that a distance between the first engagement surface and second engagement surface increases from the first end and along at least a portion of the second engagement surface. In at least some implementations, an included angle between the second engagement surface and the portion of the rear face that defines part of the support portion is less than 180 degrees.

In at least some implementations, the front face, rear face, and support portion are formed in a single piece of material.

In at least some implementations, a vehicle window installation tool includes a front face, a rear face and a support portion. The front face is defined at least in part by a first engagement surface and a stop surface, the front face extends from a first end to a second end, and from a left side to a right side, and the stop surface extends at an angle of 90 degrees or more from the first engagement surface. The rear face is defined at least in part by a second engagement surface, the rear face extends from the first end to the second end, and from the left side to the right side. The support portion is defined in part by the front face and in part by the rear face, and the support portion has a void, the void being open to a second end that is opposite to the first end. An angle between the front face and rear face at the first end is less than 30 degrees, and the second engagement surface is opposite to at least a portion of the first engagement surface, the second engagement surface extends from the first end at a non-parallel angle to the first engagement surface such that a distance between the first engagement surface and second engagement surface increases from the first end and along at least a portion of the second engagement surface.

In at least some implementations, an included angle between the second engagement surface and the portion of the rear face that defines part of the support portion is less than 180 degrees. In at least some implementations, the void is a U-shaped channel that extends through the left side, right side and second end, and the first engagement surface is parallel to, or at an angle of 30 degrees or less from being parallel to, at least one of the two sides of the channel. In at least some implementations, the stop surface is located between the first end and the void, and the stop surface overlies at least part of the void.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 4 is a view of the inside of a vehicle door showing the tool in a first position between a portion of the vehicle door and a window being installed into the vehicle door;

FIG. 5 is a sectional view taken generally along line 5-5 in FIG. 4;

FIG. 6 is a view of the inside of a vehicle door showing the tool in a second position between a portion of the vehicle door and the window being installed into the vehicle door; and FIG. 7 is a sectional view taken generally along line 7-7 in FIG. 6.

DETAILED DESCRIPTION

Figure 3:
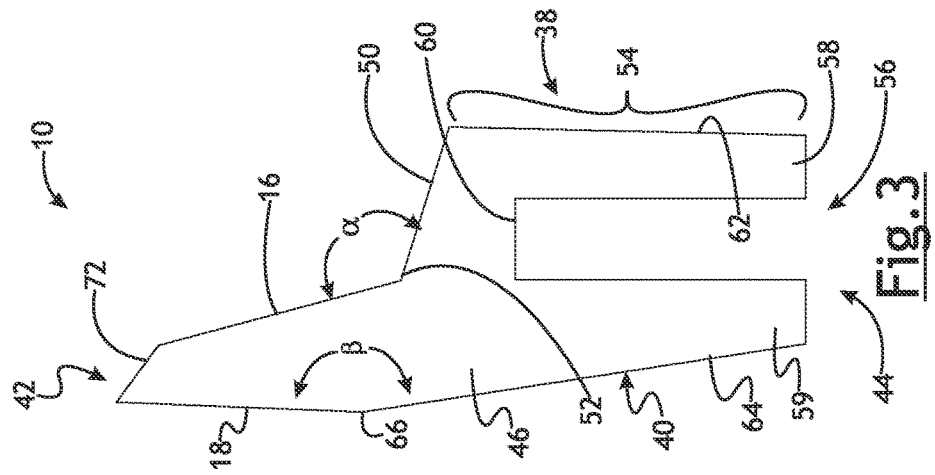
FIG. 3 is a side view of the tool.
Figure 2:
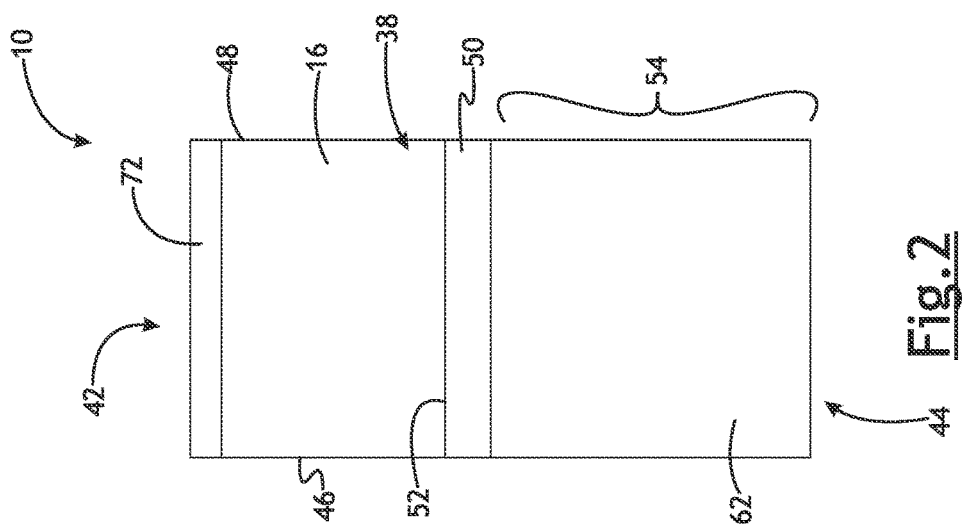
FIG. 2 is a front view of the tool.
Figure 1:
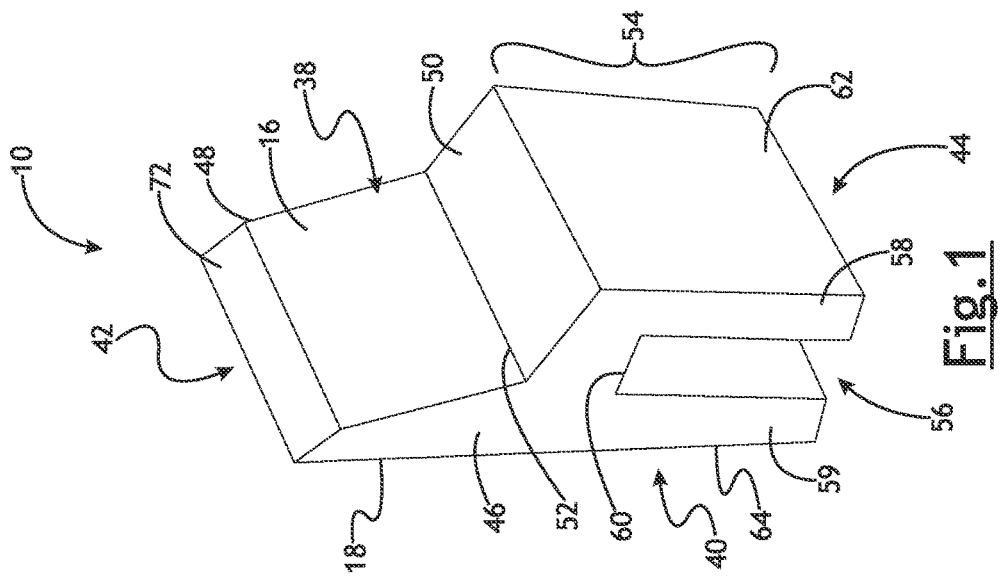
FIG. 1 is a perspective view of a vehicle window installation tool.

Referring in more detail to the drawings, FIGS. 1-3 illustrate a tool 10 that may be used in more than one position to facilitate installation of a window 12 (FIGS. 4-7) into a vehicle, and to protect the window 12 during the installation process. The tool 10 may have at least two engagement surfaces 16, 18 arranged to be in contact with a window 12 in two positions of the tool 10, as the window 12 is being installed into a vehicle.

In the example use shown in FIGS. 4-7, the tool 10 is used during installation of a window 12 into a vehicle door 20. The window 12 is a sliding window 12 that moves vertically relative to the door 20 and an opening 22 in the door 20. During installation, the window 12 is received between an inner and outer surface 28 of the door 20 and is coupled to an actuator 24, sometimes called a window regulator, that drives the window 12 between open and closed (e.g. raised and lowered) positions. During installation, it may be helpful to both hold the window 12 in a desired position while the window 12 is coupled to the actuator 24, and to protect the window 12 from direct contact with the vehicle door 20, to avoid 56 breaking the window 12.

The window 12 may include an inner surface 26, an outer surface 28, a lower edge 30, an upper edge 32, and opposed sides 34, 36. And the window 12 may be of any desired size and shape. The inner surface 26 of the window 12 may define part of a passenger compartment of the vehicle, and the outer surface 28 of the window 12 may be part of the exterior surface of the vehicle. The sides 34, 36 of the window 12 may be received within channels or tracks defined in the vehicle door 20 that retain the window 12 and guide the window 12 as it is moved between the open and closed positions. The door 20 usually includes one or more seals around the periphery of the opening 22 that engage the window 12 adjacent to the sides, and the upper and lower edges 30, 32 (when the window 12 is in the closed position) to inhibit intrusion of contaminants like water and dirt into the passenger compartment from between the window 12 and door 20.

As shown in FIGS. 1-3, the tool 10 has a front face 38 and a rear face 40 having a height defined between a first end 42 and a second end 44, and a width defined between left and right sides 46, 48. The terms "front," "rear," "left," and "right" are for ease of description of the tool 10 and are not intended to limit the disclosure—the tool may be oriented as desired. For example, what is called the front face 38 could be deemed to be a left or right side 48 or the rear of the tool 10. The rear face 40 is generally opposite to the front face 38, and the left side 46 is opposite to the right side 48. In at least some implementations, a first engagement surface 16 is defined by at least part of the front face 38 and a second engagement surface 18 is defined by at least part of the rear face 40. The engagement surfaces 16, 18 of the tool 10 may be arranged to engage the window 12 during installation of the window 12, as set forth in more detail below.

In the example shown, the first engagement surface 16 has a length between the first end 42 and a stop surface 50 that extends at an angle to the first engagement surface 16. In at least some implementations, an angle α (labeled in FIG. 3) is defined between the surfaces 16, 50, and is at least seventy-five (75) degrees, and may be ninety (90) degrees or more, such as between ninety (90) and one hundred thirty (130) degrees. A transition 52 between the surfaces 16, 50 may be defined by a rounded or straight edge corner. The first engagement surface 16 may extend all or part of the way between the left side 46 and right side 48, which is the width of the first engagement surface 16 where the width is perpendicular to the length. In at least some implementations, such as is shown in FIGS. 1, 2, 4 and 6, the tool 10 has a constant width from the first end 42 to the second end 44, so the first engagement surface 16 and stop surface 50 have the same width as the remainder of the tool 10. If desired, different portions of the tool 10 may have different widths. The first engagement surface 16 may be flat, and oriented at any desired angle.

The front face 38 may also define part of a support portion 54 of the tool 10, which may extend from the stop surface 50 to the second end 44. The support portion 54 has a void 56 that may extend through both the left and right sides 46, 48 and the second end 44 of the tool 10. In the example shown, the void 56 is a generally U-shaped channel 56 defined by side walls 58, 59 having a thickness between, respectively, the front face 38 and the channel 56, and the rear face 40 and the channel 56. A base 60 of the channel 56 may be arranged opposite to the stop surface 50, with a thickness defined between those two surfaces 50, 60. The stop surface 50 is located between the first end 42 and the void 56, and in at least some implementations, the stop surface 50 overlies at least part of the void 56. Thus, the front face 38 may be defined, at least in part, by the first engagement surface 16, the stop surface 50, and an outer surface 62 of the side wall 58 extending to the second end 44 (that defines part of an outer surface of the support portion 54).

The rear face 40 may be defined, at least in part, by the second engagement surface 18, and an outer surface 64 of the side wall 59 extending to the second end 44 (that defines part of an outer surface of the support portion 54). The second engagement surface 18 may be opposite the first engagement surface 16 and have a height defined from the first end 42 along part or all of the rear face 40. In the example shown, the second engagement surface 18 extends to an edge 66 (labeled in FIGS. 3 and 5) that is closer to the first end 42 than is the base 60 of the channel 56, and then the rear face 40 is inclined and angled toward the channel 56. Thus, a thicker portion of the tool 10 is defined between the rear face 40 and the channel 56 at the base 60 of the channel 56 than at the open end of the channel 56 (e.g. at the second end 44 of the tool 10). An included angle β (FIG. 3) between the second engagement surface 18 and the portion/surface 64 of the rear face 40 that defines part of the support portion 54 may be less than one hundred eighty (180) degrees, such as one hundred forty (140) to one hundred sixty (160) degrees. Of course, other angles could be used, including an angle of one hundred eighty (180) degrees or more than one hundred eighty (180) degrees, as desired. An angle of less than one hundred eighty (180) degrees may help to prevent contact of surface 40 with the window 12 when the tool 10 is used as a wedge and surface 18 is contacting the window 12, such as is shown in FIG. 7.

As shown in FIGS. 4 and 5, in at least one position of the tool 10, part of the vehicle door 20 may be received in the channel 56 to retain the tool 10 relative to the door 20. In the example shown, an edge 68 of the door defines an opening 70 in an inwardly facing (e.g. toward the passenger compartment) portion of a frame of the door 20 that provides access to the interior of the door 20 in which a window 12 regulator, wiring and/or other components may be received or routed. The opening 70 is covered by one or more interior trim pieces in a fully assembled/finished vehicle. With the tool 10 mounted on the door frame edge 68, when the window 12 is lowered into the door 20, the lower edge 30 of the window 12 may engage the first engagement surface 16 of the tool 10, or the stop surface 50 (or both), so that the tool 10 is between the window 12 and the door 20 frame. This prevents the window 12 from engaging and being damaged by the door frame, and prevents or inhibits the window 12 from engaging other components which may scratch or otherwise damage a coating on the window 12.

When the tool 10 is mounted on a surface/edge 68 of the door 20 that is parallel or generally parallel to the window 12, the length of engagement between the window 12 and the first engagement surface 16 may be across all or part of the width of the first engagement surface 16. The width of the first engagement surface 16 may be between one (1) inch and six (6) inches, and in use provides a length of engagement with the window 12 that suitably distributes the weight of the window 12 to avoid 56 damage to the window 12.

As shown in FIGS. 3 and 5, the first engagement surface 16 may be generally parallel to channel 56, where "generally parallel" means within thirty (30) degrees of parallel. In other words, the first engagement surface 16 may be generally parallel to at least one of the two sides 58, 59 of the channel 56. In at least some implementations, as noted above, the angle α between the first engagement surface 16 and the stop surface 50 is greater than ninety (90) degrees and so the first end 42 extends inwardly into the opening 70 of the door 20 relative to the door edge 68 upon which the tool 10 is mounted. This facilitates lining up the tool 10 and window 12, which is received in the door opening 70, for engagement, and ensures that the window 12 may contact the first engagement surface 16 somewhere along the height of the first engagement surface 16, or the window 12 may engage the stop surface 50. In this regard, the stop surface 50 may have a thickness defined between the transition 52 and the portion of the front face 38 that defines part of the support portion 54, and the stop surface 50 thickness may be at least twice the thickness of the window 12.

As shown in FIGS. 6 and 7, the tool 10 may be oriented in a second position in which part of the door 20 is not received in the channel 56, and the first engagement surface 16 engages part of the door 20, not the window 12. The window 12 instead engages the second engagement surface 18 of the tool 10, with the first end 42 of the tool 10 received between the window 12 and the door 20. Thus, the first end 42 of the tool 10 is wedged between the window 12 and part of the door 20, to keep the window 12 away from that part of the door 20. In this example, the tool 10 is inserted in a lower portion of the window opening 22 of the door 20 and engages a lower portion of the window 12 to maintain the window 12 raised (relative to the bottom of the door 20) within the window opening 22, for example, to facilitate coupling the window 12 to the window actuator 24.

To facilitate insertion of the first end 42 of the tool 10 between the window 12 and door 20, the first end 42 may be tapered, to define a wedge-shaped first end 42. An inclined surface 72 may be defined between the first end 42 and the first and/or second engagement surface 18 (e.g. on either or both of the front and rear face 40s of the tool 10), and the inclined surface(s) 72 may be considered to define part of an adjacent engagement surface. In the example shown, an inclined surface 72 defines part of the front face 38 and leads to the first end 42 of the tool 10, which may be defined by a narrow or thin edge defined between the rear face 40 and the inclined surface 72, with an angle between those surfaces being fifty (50) degrees or less. In at least some implementations, the first and second engagement surfaces 16, 18 are closer to the first end 42 than the second end 44, and the first end 42 is thinner (distance between front and rear face 40s) than the second end 44. The second engagement surface 18 is opposite to at least a portion of the first engagement surface 16, the second engagement surface 18 extends from the first end 42 at a non-parallel angle to the first engagement surface 16 such that a distance between the first engagement surface 16 and second engagement surface 18 increases from the first end 42 and along at least a portion of the second engagement surface 18.

The tool 10 may be formed from a single piece of material, such as by injection molding. The tool 10 could be formed from different materials with a portion overmolded onto another portion either within the same mold, or at different times, as desired. For example, portions of the tool 10 may include a more rigid and stronger material that is overmolded or coated with a softer, more flexible material, at least where the tool 10 may engage a window 12. Representative materials for the tool 10 include various polymeric materials like nylon, rubber, or polyurethane, and natural materials like wood can be used, or metals may be used, for example when coated or with a softer material molded onto at least certain surfaces that engage a window in use. At least the engagement surfaces 16, 18 may have a hardness ranging from Shore A 60D to 100D on the Shore Hardness Scale if made from a polymeric material. All surrounding surfaces may have a hardness ranging from Shore A 80D to 100D or Shore D 30D to 60D, if made from a polymeric material.

The tool 10 may also be used in other positions. For example, the tool 10 may be inverted from the position shown in FIG. 7 so that a portion of the door 20 is received in the channel 56, with the window 12 contacting the first or second engagement surface 16, 18, or another surface such as part of the front face 38 or rear face 40 that defines the support portion 54 of the tool 10 (e.g. surface 62, 64). Still other positions may be used. While a single tool 10 is shown in the drawings, multiple, individual tool 10s may be used to hold the window 12 in a desired position relative to the door 20.

What is claimed is:

1. A vehicle window installation tool, comprising:
 a front face defined at least in part by a first engagement surface, the front face extending from a first end of the tool to a second end of the tool that is opposite to the first end, and from a left side of the tool to a right side of the tool;
 a rear face defined at least in part by a second engagement surface, the rear face extending from the first end of the tool to the second end of the tool, and from the left side of the tool to the right side of the tool;
 wherein the first end of the tool is wedge shaped, and a support portion is defined in part by the front face and in part by the rear face, and the support portion has a void, the void being open to each of the left side of the tool, the right side of the tool and the second end of the tool, and the void is defined between a surface of a first side wall, a surface of a second side wall and a base that extends between said surface of the first side wall and said surface of the second side wall, and wherein the base, said surface of the first sidewall and said surface of the second side wall are received between and spaced from the front face and the rear face, and wherein the front face also includes a stop surface extending from and at an angle of between 75 degrees and 130 degrees relative to the first engagement surface, wherein the front face has a height defined between the first end and the second end, and the stop surface is located at a height between the first end and the base, and the base is located at a height between the stop surface and the second end.

2. The tool of claim 1 wherein, in the direction from the first end to the second end, the stop surface extends between the first engagement surface and the first sidewall.

3. The tool of claim 2 wherein the stop surface is arranged at an angle of between 90 degrees and 130 degrees relative to the first engagement surface.

4. The tool of claim 2 wherein the stop surface has a thickness of at least twice a thickness of a window with which the tool is adapted to be used.

5. The tool of claim 1 wherein an angle between the front face and rear face at the first end is less than 30 degrees.

6. The tool of claim 1 wherein the void is a channel that extends through the left side of the tool, the right side of the tool and the second end of the tool, and the side walls each extend from the left side of the tool to the right side of the tool.

7. The tool of claim 1 wherein the first engagement surface and second engagement surface each have a hardness between 60D and 100D on the Shore A hardness scale.

8. The tool of claim 1 wherein the second engagement surface is opposite to at least a portion of the first engagement surface, the second engagement surface extends from the first end at a non-parallel angle to the first engagement surface such that a distance between the first engagement surface and second engagement surface increases from the first end and along at least a portion of the second engagement surface.

9. The tool of claim 1 wherein an included angle between the second engagement surface and the portion of the rear face that defines part of the support portion is less than 180 degrees.

10. The tool of claim 6 wherein the first engagement surface is parallel to, or at an angle of 30 degrees or less from being parallel to, at least one of two sides of the channel.

11. The tool of claim 2 wherein the stop surface is located between the first end and the void, and the stop surface overlies at least part of the void.

12. The tool of claim 1 wherein the front face, rear face, and support portion are formed in a single piece of material.

13. A vehicle window installation tool, comprising:
a front face defined at least in part by a first engagement surface and a stop surface, the front face extending from a first end of the tool to a second end of the tool, and from a left side of the tool to a right side of the tool, and the stop surface extending at an angle of 75 degrees or more from the first engagement surface and the stop surface extends from the first engagement surface and is located between the first engagement surface and the second end of the tool;
a rear face defined at least in part by a second engagement surface, the rear face extending from the first end of the tool to the second end of the tool, and from the left side of the tool to the right side of the tool; and
a support portion is defined in part by the front face and in part by the rear face, and the support portion has a void, the void being open to the second end of the tool, and the void being open to both the left side of the tool and the right side of the tool, wherein, an angle between the front face and rear face at the first end is less than 30 degrees, and wherein the second engagement surface is opposite to at least a portion of the first engagement surface, the second engagement surface extends from the first end at a non-parallel angle to the first engagement surface such that a distance between the first engagement surface and second engagement surface increases from the first end and along at least a portion of the second engagement surface.

14. The tool of claim 13 wherein an included angle between the second engagement surface and the portion of the rear face that defines part of the support portion is less than 180 degrees.

15. The tool of claim 13 wherein the void is a U-shaped channel having a first side wall, a second side wall and a base, wherein the first side wall extends to the second end of the tool, the left side of the tool, the right side of the tool and the base, and the first side wall has a thickness between the front face and the void, wherein the second side wall extends to the second end of the tool, the left side of the tool, the right side of the tool and the base and the first side wall has a thickness between the rear face and the void, and the first engagement surface is parallel to, or at an angle of 30 degrees or less from being parallel to, at least one of the two sides of the channel.

16. The tool of claim 13 wherein the stop surface is located between the first end and the void, and the stop surface overlies at least part of the void between the front face and the rear face.

* * * * *